May 25, 1954  E. N. MAY  2,679,372
GRATER SUPPORT
Filed May 10, 1949

E. N. May
INVENTOR
BY
ATTORNEYS.

Patented May 25, 1954

2,679,372

UNITED STATES PATENT OFFICE 2,679,372

GRATER SUPPORT

Edward N. May, Washington, D. C.

Application May 10, 1949, Serial No. 92,351

2 Claims. (Cl. 248—205)

This invention relates to an article adapted to support firmly, in operating position, the conventional food grater such as is used for the purpose of grating cheese, the skin of citrus fruits, etc.

As is well known, the conventional food grater is a flat member comprising a wire frame on which is mounted a piece of sheet metal formed with outstruck perforations, said frame having at its upper end a handle whereby the user may hold the grater erect upon a table top or the like, with one hand while rubbing, with the other hand, the food to be grated against the perforated surface.

It is very difficult to hold a grater of the type stated steady, and too often the lower end of the grater will slip upon the table top or other work surface, scattering the grated food, skinning the user's knuckles, and otherwise presenting a decided inconvenience. Additionally, even while the grater is being held erect, considerable effort is expended in holding it in its operating position, and even then, the grater will wobble so that full grating efficiency is not obtained.

It is an important object of the present invention, accordingly, to provide a support for a grater of the type stated, which support will eliminate all the inconveniences and defects stated above, the support being particularly adapted, by reason of a novel construction, to support the grater in a predetermined position determined to be most efficient for grating operations, said support being further adapted to hold the grater in a manner which eliminates completely the possibility of the grater slipping, wobbling, or scattering the grated food.

Another important object is to provide a grater support of the type stated which will be durable, the support embodying a minimum of parts simply arranged, in a manner to permit manufacture of the support at low cost.

Another important object is to provide a support of the type stated which will be highly sanitary, the support being so designed as to eliminate almost entirely the possibility of food wedging in crevices or corners.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 1:
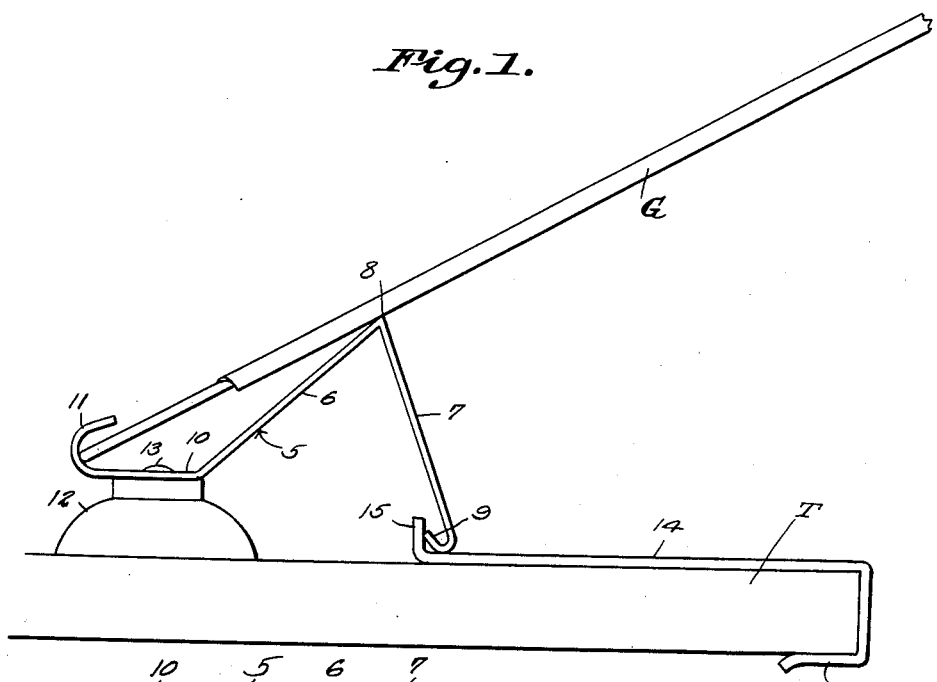
Fig. 1 is a side elevational view of a grater support constructed in accordance with the invention, a grater and table top with which the support is associated being shown fragmentarily.
Figure 2:
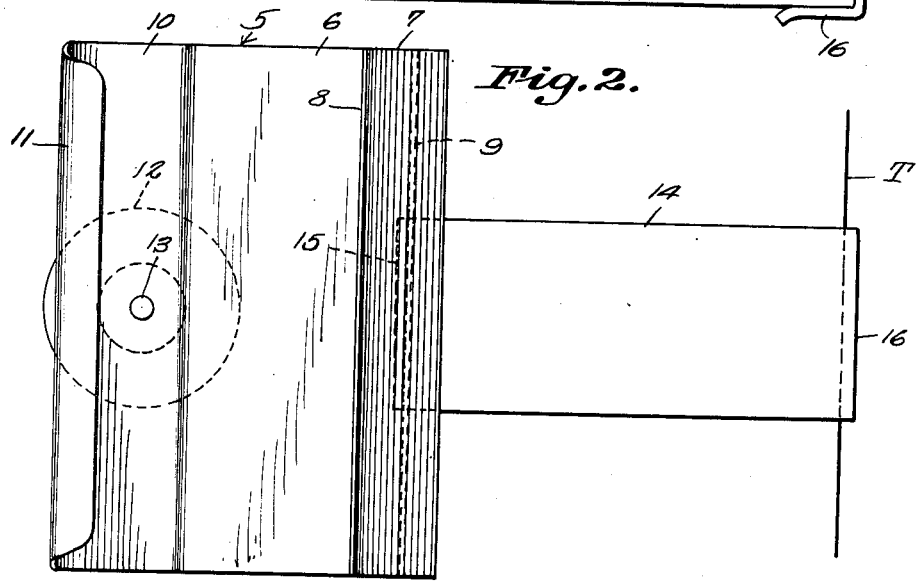
Fig. 2 is a top plan view, the grater being removed.

Referring to the drawings in detail, for the purpose of illustrating the use to which the grater support is put, I have shown fragmentarily a table top T and grater G, neither of which represents any part of the present invention. The present invention has reference to a support for supporting the grater G upon the table top T, and in the illustrated embodiment of the invention, said support includes a body generally designated 5 and formed from a suitable blank, substantially rectangular in shape, of sheet metal material such as aluminum, stainless steel, or the like. In this connection, it should be pointed out that although in the present embodiment of the invention I have illustrated the support as being fabricated from a sheet of metal material, it will be apparent from the description to be provided hereinafter that the construction can as well utilize other material, whether in the form of a sheet or in the form of a frame. For example, I believe it is well within the spirit of the invention to utilize a wire frame of skeleton construction in place of the sheet metal body 5, as long as said wire frame were formed to the shape of the body so as to be supported at approximately the same points, as to provide points of support for a grater the same as provided on the sheet metal body 5 illustrated as the present preferred example of the invention.

In any event, the body 5 can readily form a single piece of suitable material shaped to provide an inclined front wall 6 integral with an inclined rear wall 7, said front and rear walls 6 and 7 converging upwardly to meet at their upper ends, thus to provide a transversely extended ridge 8 disposed below and transversely of the medial portion of a grater G to be supported.

As may be readily noted from Fig. 1, the rear wall 7 is inclined somewhat more steeply than the front wall 6, but preferably is of a length corresponding to the length of said front wall. At its lower end, the rear wall 7 preferably is formed integrally with a flanged lower edge 9 so as to provide a rounded surface which will not scar a table top.

At its front or lower end, the inclined front wall 6 merges into a short horizontal portion 10 the front end of which is integral with an upturned rearwardly curved lip or flange 11.

Disposed under the horizontal portion 10 is the rubber suction cup 12, secured to said horizontal portion by fastening means 13.

On any smooth work surface T, the rubber suction cup 12 will hold the entire device and grater supported thereby against shifting on said work surface. Where, however, the work surface is rough or is of a material which will prevent the rubber suction cup 12 from taking hold of said surface, supplemental holding means is employed to keep the article from its normal tendency to shift to the left in Fig. 1. In the present instance, this means comprises a strap 14 of sheet metal material having at its front end the upturned lip or abutment 15 behind which engages the lower edge 9 of the rear wall 7, said strap 14 having at its rear end the clamping flange 16 adapted to grip the edge of the table top T.

It will be understood that the means 14 is not necessary except in situations where the rubber suction cup 12 will not be held to the work surface with full suction due to said surface being irregular, scored, or being of a material which will not hold the cup.

Additionally, I believe that under some conditions, other means can be employed for holding the article against shifting upon the work surface, rather than the suction cup 12 or holding means 14. Such means, for example, can embody conventional screw clamps, wall brackets, or the like.

In use of the device, a grater G is supported thereon as illustrated in Fig. 1, the lower end of the grater, which normally would be in contact with the table top T, being supported within the upturned lip 11, the rearwardly curved formation of said lip preventing upward swinging of the lower end of the grater, so as to hold the grater in proper position upon the support.

When the grater is so positioned, it will be supported, between its center and lower end, upon the ridge 8, with said grater being supported in the present instance at an angle of approximately 45 degrees more or less relative to the table top T. Assuming that the body 5 has been secured against movement relative to the table top T by means of the rubber suction cup 12 and/or the holding means 14, the article is ready for use and the user simply grasps the upper end of the grater with one hand while rubbing the food to be grated upon the inclined grater surface with the other hand.

Considering Fig. 1, it will be noted that the tendency during the grating operation will be to exert a vertical downward pressure upon the medial portion of the grater disposed to the right of the ridge 8. In this connection, there will be certain resiliency in the rear wall 7, so that said downward pressure will be changed in direction so as to be exerted rearwardly or to the right in Fig. 1, that is, toward the user of the grater. This is so because the front end of the grater is held against any movement.

There is an advantage in this characteristic of the device in that the rearward yielding of the rear wall 7 during the grating operation relieves or lessens the upward pull of the grater upon the front end of the support, thus to reduce the possibility of loss of suction on the part of the cup 12.

It is to be further noted that the construction is such that during the use of the device, the grater G is disposed at a lesser angle from the horizontal than the angle from the horizontal assumed by the front wall 6. This is by reason of the fact that the front wall 6 is integral at its lower or front end with a forwardly extending horizontal portion 10, which in turn is integral at its front end with the rearwardly curved lip 11. By reason of this arrangement, when one exerts the usual downward and forward pressure upon the grater, which pressure inevitably occurs when one grips the grater at its upper end and with the other hand reciprocates an article of food to be grated upwardly and downwardly on the grater, the front end of the grater slides forwardly to engage under the lip 11. The difference in angles of the grater and front wall necessarily results, as a result of which the grater is in contact with the device at only two points. One of these is at the point of contact between the grater and ridge 8. The other is at the point of contact between the front end of the grater and the interior surface of the lip 11. Grated particles of food are thus permitted to move through the perforations of the grater freely at any point from end to end of the perforated web of the grater, with the single exception, of course, of any perforations which might be disposed along the line of contact between the grater and pointed ridge 8. These of course would obviously be so few as to interfere very little, if at all, with the dropping of the food particles through the perforations of the grater. Grated particles are still free to drop through perforations both rearwardly of the ridge 8 and forwardly thereof. With reference to the dropping of particles through the grater forwardly of the ridge 8, this is permitted because the difference in angles between the grater and front wall 6 defines an open space between the front wall and the forward portion of the grater. This open space results from the fact that the grater is in contact, along the ridge 8, with rear or upper edge of the front wall, but is elevated above the front wall forwardly of the ridge 8, due to the fact that the engagement between the front end of the grater and the retaining lip 11 will be at a point spaced a substantial distance forwardly of the front or lower end of the front wall 6, and in a plane elevated above said front or lower end of the front wall.

What is claimed is:

1. A grater support comprising an elongated body of transversely V-shaped cross section having legs which lie at an acute angle and are substantially of equal length, an extension carried by one of the legs and extending outwardly therefrom at an obtuse angle with relation thereto, a lip on said extension remote from said body and curving laterally from said extension to project toward the apex of the body whereby to engage the lower edge of a grater and together with the apex of the body hold the grater in an upwardly inclined position relative to a horizontal supporting surface and inter-engaging fastening means on the legs of the body and the supporting surface for anchoring said body on the supporting surface upon application of a downward force on said grater.

2. A grater support comprising an elongated body of transversely V-shaped cross section having legs which lie at an acute angle and are of substantially equal length, an extension carried by one of the legs and extending outwardly therefrom at an obtuse angle with relation thereto, a lip on said extension remote from said body and curving laterally from said extension to project toward the apex of the body whereby to engage the lower edge of a grater and together with the apex of the body hold the grater in an upwardly inclined position relative to a horizontal supporting surface and inter-engaging fastening means on the extension, the other leg of said body and the supporting surface for anchoring said body on the supporting surface upon application of the downward force on said grater.

References Cited in the file of this patent

UNITED STATES PATENTS

| Number | Name | Date |
|---|---|---|
| 1,439,351 | Alsip et al. | Dec. 19, 1922 |
| 1,812,318 | Bower | June 30, 1931 |
| 2,103,485 | Meyer | Dec. 28, 1937 |
| 2,193,991 | Treacy | Mar. 19, 1940 |
| 2,222,665 | Hoenigsberg | Nov. 26, 1940 |